(12) United States Patent
Asghari et al.

(10) Patent No.: US 8,090,231 B1
(45) Date of Patent: Jan. 3, 2012

(54) TRANSFER OF LIGHT SIGNALS BETWEEN OPTICAL FIBERS AND SYSTEM USING OPTICAL DEVICES WITH OPTICAL VIAS

(75) Inventors: Mehdi Asghari, San Marino, CA (US); Dazeng Feng, Arcadia, CA (US); Daniel C. Lee, Rosemead, CA (US)

(73) Assignee: Kotura, Inc., Monterey Park, CA (US)

( * ) Notice: Subject to any disclaimer, the term of this patent is extended or adjusted under 35 U.S.C. 154(b) by 926 days.

(21) Appl. No.: 12/148,784

(22) Filed: Apr. 21, 2008

(51) Int. Cl.
*G02B 6/26* (2006.01)
(52) U.S. Cl. .......................................... 385/39
(58) Field of Classification Search ...................... 385/49
See application file for complete search history.

(56) References Cited

U.S. PATENT DOCUMENTS

| | | | |
|---|---|---|---|
| 5,757,986 A | 5/1998 | Crampton et al. | |
| 5,908,305 A | 6/1999 | Crampton et al. | |
| 6,236,786 B1 * | 5/2001 | Aoki et al. | 385/50 |
| 6,694,068 B2 * | 2/2004 | Parker | 385/14 |
| 6,801,702 B2 | 10/2004 | Day | |
| 7,391,937 B2 | 6/2008 | Thorson et al. | |
| 2003/0235371 A1 * | 12/2003 | Shimada et al. | 385/50 |
| 2004/0022496 A1 * | 2/2004 | Lam | 385/49 |
| 2004/0184717 A1 | 9/2004 | Koontz et al. | |
| 2004/0202414 A1 | 10/2004 | Wong et al. | |
| 2005/0041906 A1 | 2/2005 | Sugama et al. | |
| 2005/0244106 A1 * | 11/2005 | Fukuyama et al. | 385/49 |
| 2006/0018588 A1 | 1/2006 | Uchida | |
| 2006/0041906 A1 | 2/2006 | Sugama et al. | |
| 2006/0056756 A1 | 3/2006 | Uchida | |
| 2006/0126995 A1 | 6/2006 | Glebov et al. | |
| 2006/0215963 A1 * | 9/2006 | Hamano | 385/49 |
| 2007/0160322 A1 | 7/2007 | Ide et al. | |
| 2007/0183720 A1 | 8/2007 | Ide et al. | |

* cited by examiner

*Primary Examiner* — Sung Pak
(74) *Attorney, Agent, or Firm* — Gavrilovich, Dodd & Lindsey, LLP

(57) ABSTRACT

An optical system includes optical devices that each have a top side and a bottom side between lateral sides. A first one of the devices has one or more first waveguides immobilized on a first base. The first device having a first via that defines an optical path that extends from the top side of the first device to the bottom side of the first device. A second one of the devices has a second waveguide immobilized on a second base. An optical fiber has a fiber facet immobilized relative to the first device and aligned with the first via. The first device is between the fiber facet and the second device. The first device, the second device and the optical fiber are arranged such that a light signal exchanged between the optical fiber and the second waveguide travels through the first via.

17 Claims, 10 Drawing Sheets

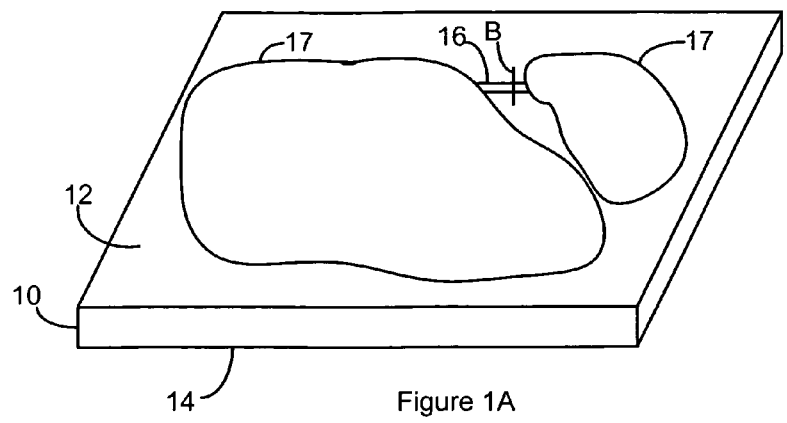
Figure 1A
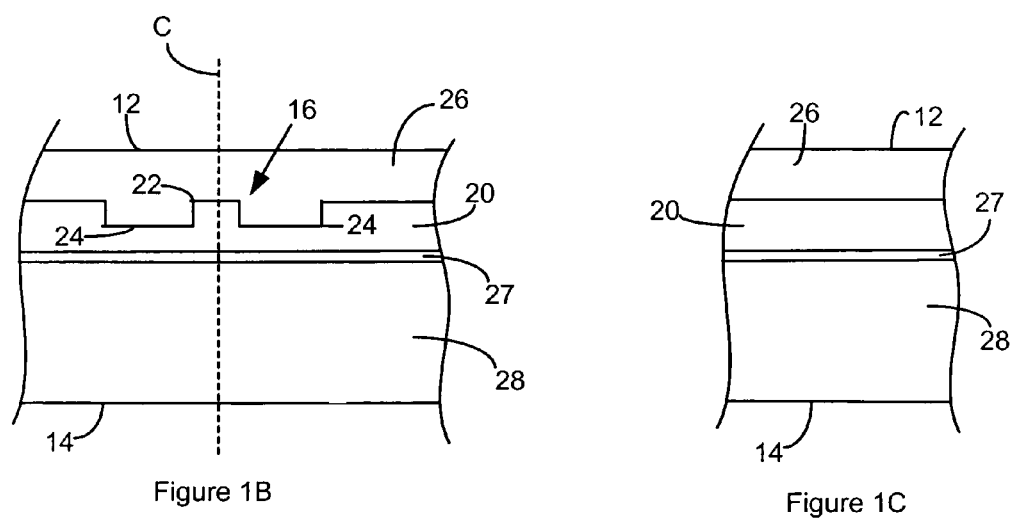
Figure 1B
Figure 1C

TRANSFER OF LIGHT SIGNALS BETWEEN OPTICAL FIBERS AND SYSTEM USING OPTICAL DEVICES WITH OPTICAL VIAS

FIELD

The present invention relates to optical devices and particularly, to systems that transfer the light signals from one optical device to another optical device.

BACKGROUND

Optical systems have been developed that use optical devices stacked on top of one another. The optical devices can include optical vias that allow light signals to travel through one of the devices to another device and/or that allow light signals to from one of the devices and through another device. The edges of these devices generally include facets through which light signals can enter and/or exit the system. However, formation of these facets often require the difficult steps of polishing an edge of the device. Further, facets positioned at the edges of the devices can limit the flexibility of the system by requiring that the light signals be routed between an edge of a device and the part of the system where the signal is processed. This routing can require that the light signals are routed over, under, or through waveguides or other device in the path of the light signal. As a result, this routing can be associated with optical loss.

For the above reasons, there is a need for a more efficient interface between optical fibers and a system having one or more optical devices with optical vias.

SUMMARY

An optical system includes optical devices that each have a top side and a bottom side between lateral sides. A first one of the devices has one or more first waveguides immobilized on a first base. The first device having a first via that defines an optical path that extends from the top side of the first device to the bottom side of the first device. A second one of the devices has a second waveguide immobilized on a second base. An optical fiber has a fiber facet immobilized relative to the first device and aligned with the first via. The first device is between the fiber facet and the second device. The first device, the second device and the optical fiber are arranged such that a light signal exchanged between the optical fiber and the second waveguide travels through the first via.

The portion of the optical fiber that includes the facet can be substantially perpendicular to the first device or can be substantially parallel to the first device.

BRIEF DESCRIPTION OF THE FIGURES

FIG. 1A through FIG. 1C illustrate an optical device within the class of optical devices called planar optical devices. FIG. 1A is a topview of the device.

FIG. 1B is a cross-section of the device shown in FIG. 1A taken along the line labeled B.

FIG. 1C is a cross-section of the device shown in FIG. 1B taken along the line labeled C.

FIG. 2A is a topview of a device.

FIG. 2B is a cross-section of the device shown in FIG. 2A taken along the line labeled B.

FIG. 2C is a cross-section of the device shown in FIG. 2A taken along the line labeled B.

FIG. 3A is a topview of the optical device.

FIG. 3B is a cross-section of the device shown in FIG. 3A taken along the line labeled B.

FIG. 5A is a perspective view of the interface.

FIG. 5B shows a cross section of the device and fiber shown in FIG. 5A in combination with a cross section of a second device included in the system. The cross section is taken through the axis of the optical fiber.

FIG. 6A is a perspective view of the interface.

FIG. 6B shows a cross section of the device and fiber shown in FIG. 6A in combination with a cross section of a second device included in the system. The cross section is taken through the axis of the optical fiber.

FIG. 6C is a perspective view of a holder that holds the optical fiber as shown in FIG. 6A and FIG. 6B.

DESCRIPTION

Figure 2A:
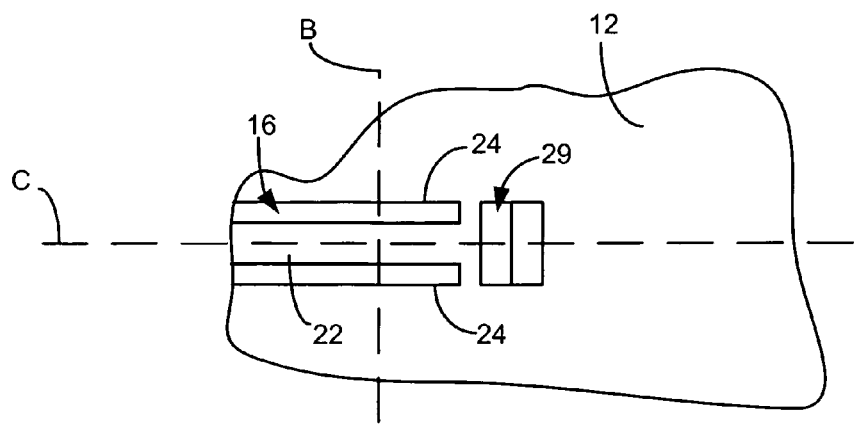
FIG. 2A through FIG. 2C illustrate a portion of an optical device that includes a port configured to receive a light signal from a waveguide or configured to direct light signals from outside of the device into the waveguide.

An optical system includes stacked planar optical devices. One or more of the optical devices having an optical via that extends from the top of the device to the bottom of the device. As a result, a light signal can pass through the device. One or more of the devices can also make use of components such as wedges and ports that are configured to change a direction that a light signal travels through the system. For instance, a first device can include a combination of wedges and ports constructed to direct a light signal received from another device located above or below the first device into a waveguide on the first device or to direct a light signal from a waveguide on the first device toward another device located above or below the device. The combination of vias, ports, and wedges allows optical fibers located above and/or below the system to introduce light signals into the system or withdraw light signal from the system. For instance, an optical fiber can direct a light signal through a via in the uppermost optical device in the system. The light signal can travel through that device to another device located lower in the system. The lower device can include a wedge and port that direct the light signal into a waveguide on the lower device.

Since the via that are used to introduce or extract light signals from the system extend from the top of the device to the bottom of the device, the location of the via in the system is not restricted. As a result, the locations of these vias can be selected to reduce complex routing of light signals. Additionally, since the vias extend from the top of the device to the bottom of the device, the need for polishing an edge of a device can be eliminated.

FIG. 1A through FIG. 1C illustrate an optical device. FIG. 1A is a topview of the device. FIG. 1B is a cross-section of the device shown in FIG. 1A taken along the line labeled B. FIG. 1C is a cross-section of the device shown in FIG. 1B taken along the line labeled C. The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 10 (or edges) extending from a top side 12 to a bottom side 14. The propagation direction of light signals along the length of the waveguides on a planar optical device generally extend through the lateral sides 10 of the device. The top side 12 and the bottom side 14 of the device are non-lateral sides.

The device includes one or more waveguides 16 that carry light signals between optical components 17. Examples of optical components 17 that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, light sensors that convert an light signal to an electrical signal, and vias that provide an optical pathway for a light signal traveling through the device from the bottom side 14 of the device to the top side 12 of the device. Additionally, the device can optionally, include electrical components. For instance, the device can include electrical connections for applying a potential or current to a waveguide and/or for controlling other components on the optical device.

The waveguide 16 is defined in a first light-transmitting medium 20 positioned on a base 18. The first light-transmitting medium 20 includes a ridge 22 defined by trenches 24 extending partially into the first light-transmitting medium 20 or through the first light-transmitting medium 20. Suitable first light-transmitting media include, but are not limited to, silicon, polymers, silica, SiN, GaAs, InP and LiNbO$_3$. A fourth light-transmitting medium 26 is optionally positioned on the first light-light transmitting medium. The fourth light-transmitting medium 26 can serve as a cladding for the waveguide and/or for the device. When the first light-transmitting medium 20 is silicon, suitable fourth light-transmitting media include, but are not limited to, silicon, polymers, silica, SiN, GaAs, InP and LiNbO$_3$.

The portion of the base 18 adjacent to the first light-transmitting medium 20 is configured to reflect light signals from the waveguide 16 back into the waveguide 16 in order to constrain light signals in the waveguide. For instance, the portion of the base 18 adjacent to the first light-transmitting medium 20 can be an optical insulator 27 with a lower index of refraction than the first light-transmitting medium 20. The drop in the index of refraction can cause reflection of a light signal from the first light-transmitting medium 20 back into the first light-transmitting medium 20. The base 18 can include the optical insulator 27 positioned on a substrate 28. As will become evident below, the substrate 28 can be configured to transmit light signals. For instance, the substrate 28 can be constructed of a light-transmitting medium that is different from the first light-transmitting medium 20 or the same as the first light-transmitting medium 20. In one example, the device is constructed on a silicon-on-insulator wafer. A silicon-on-insulator wafer includes a silicon layer that serves as the first light-transmitting medium 20. The silicon-on-insulator wafer also includes a layer of silica positioned on a silicon substrate. The layer of silica can serving as the optical insulator 27 and the silicon substrate can serve as the substrate 28.

Figure 2B:
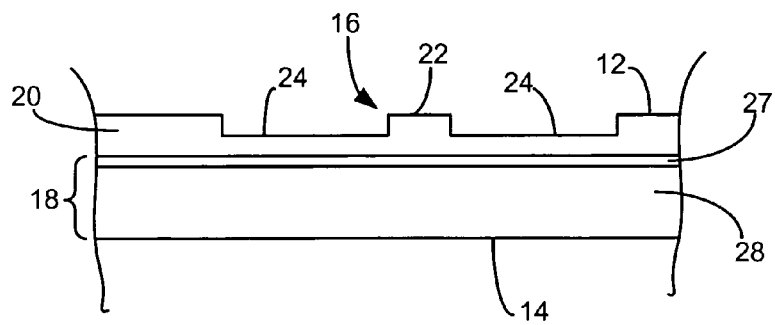
Figure 2C:
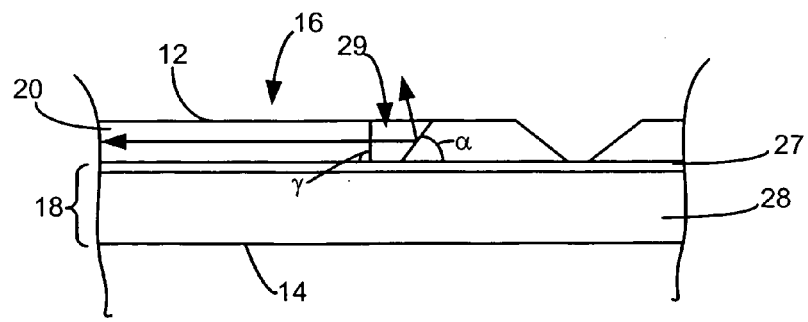

As noted above, an optical port is an example of an optical component that can be included on the optical device. FIG. 2A through FIG. 2C illustrate a portion of an optical device that includes a port configured to receive a light signal from a waveguide 16 or configured to direct light signals from outside of the device into the waveguide 16. FIG. 2A is a topview of the device. FIG. 2B is a cross-section of the device shown in FIG. 2A taken along the line labeled B. FIG. 2C is a cross-section of the device shown in FIG. 2A taken along the line labeled B.

The port includes a port recess 29 that extends into or through the first light-transmitting medium 20. The port recess 29 includes one or more sides. The illustrated port includes a bottom side 30 and a plurality of lateral sides including a waveguide side 32 and a reflecting side 34.

A second light-transmitting medium 36 is positioned in the port recess 29. The second light-transmitting medium 36 can be a liquid or a gas and is preferably a solid. The second light-transmitting medium 36 can have a different index of refraction than the first light-transmitting medium 20. Suitable second light-transmitting media include, but are not limited to, air, epoxy, polymers, spin-on glasses and evaporated or sputtered films. An example of a suitable polymer is Polyimide PI2611 that is not a substantial source of stress for an optical device constructed on a silicon-on-insulator wafer.

As evident in FIG. 1B, the waveguide side 32 can be positioned at an angle γ measured relative to the base 18 and the reflecting side 34 can be positioned at an angle α measured relative to the base 18. The angle γ can be the same or different from the angle α. A suitable range of angles for γ and/or α includes, but is not limited to, angles in the range from 0° to 90°, and 45° to 90° and angles less than 89°, 87° or 85°. When the first light-transmitting medium 20 is silicon and the port recess 29 is formed by etching, a suitable angle for γ and/or α is about 54.7° since the crystalline structure of the silicon layer causes sides of the port recess 29 to be naturally etched at an angle of about 54.7°. In one example, the angle γ is about 90° and α is about 54.7°.

During operation of the device, a light signal guided by the waveguide 16 travels to an end of the waveguide 16 and is traveling in the direction of propagation immediately before exiting the waveguide 16. The light signal exits from the waveguide 16 and is received by the port. The light signal travels through the port. For instance, the light signal travels through the waveguide side 32 of the port recess 29 and accordingly enters the port traveling in a first direction. The first direction can be the same or different from the direction of propagation. For instance, if the direction of propagation is not normal to the waveguide side 32 and the second light-transmitting medium 36 has an index of refraction that is different from the first light-transmitting medium 20, there may be some refraction that changes the direction of the light signal upon the light signal entering the second light-transmitting medium 36. The light signal travels through the second light-transmitting medium 36 to the reflecting side. The reflecting side reflects the light signal. The light signal then travels through the second light-transmitting medium 36 and exits the second light-transmitting medium 36. Before exiting from the second light-transmitting medium 36, the light signal is traveling in a second direction. The second direction is toward a location that is over a non-lateral side of the device such as the top side 12 of the device or the bottom side 14 of the device. FIG. 1B illustrates the second direction as being toward a location that is above the device.

Although the operation of the device is described in the context of a light signal traveling from the waveguide 16 and then through the port, the device can be operated in reverse. For instance, the port can receive a light signal from above the device and then reflect the light signal such that the light signal is received and guided by the waveguide 16.

Figure 2D:
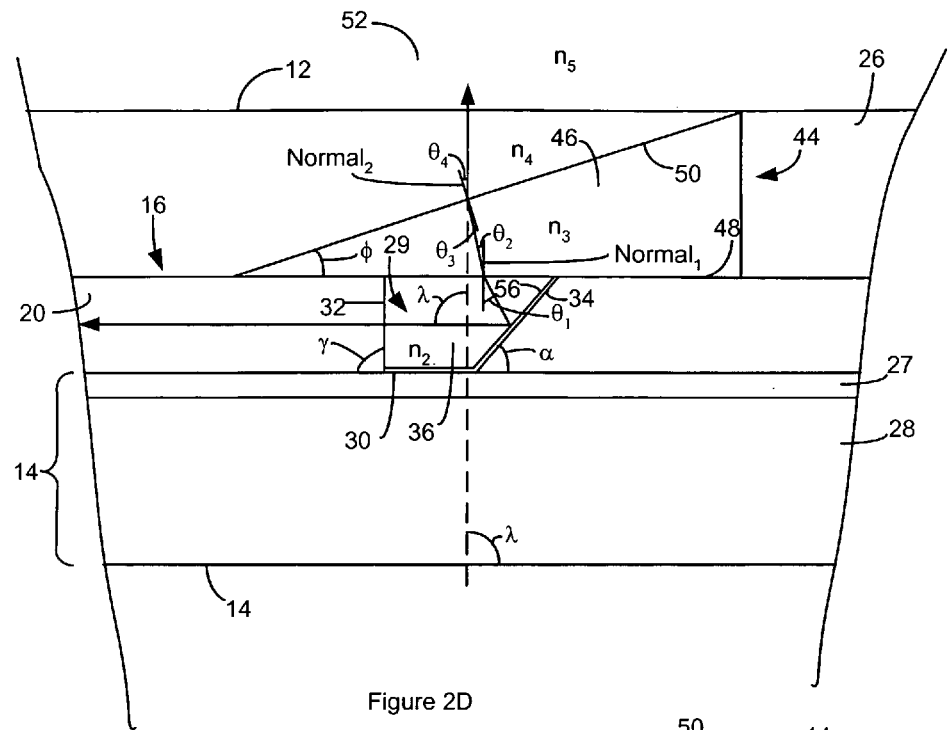
FIG. 2D illustrates a wedge positioned on the optical device of FIG. 2A through FIG. 2C.

FIG. 2D illustrates a wedge 44 positioned on the optical device of FIG. 1A through FIG. 2C. The wedge 44 includes or consists of a third light-transmitting medium 46. The third light-transmitting medium 46 can be the same as the second light-transmitting medium 36 or different from the second light-transmitting medium 36. The wedge 44 includes an interface side 48 and a correction side 50. The wedge 44 is positioned so light signals that exit from the port pass through the interface side 48 of the wedge 44, through the third light-transmitting medium 46 and then exit the wedge 44 through the correction side 50. The light signal enters the fourth light-transmitting medium 26 after passing through the correction side 50. The light signal can pass through the fourth light-transmitting medium 26 and into a fifth light-transmitting medium 52.

In FIG. 2D, the interface side 48 has a normal labeled "normal$_1$" and the correction side 50 has a normal labeled "normal$_2$." The second light-transmitting medium 36 has an index of refraction labeled $n_2$. The third light-transmitting medium 46 has an index of refraction labeled $n_3$. The fourth light-transmitting medium 26 has an index of refraction labeled $n_4$. The fifth light-transmitting medium 52 has an index of refraction labeled $n_5$.

During operation of the device, the light signal exits the second light-transmitting medium 36 at an angle $\theta_1$ relative to normal$_1$. The light signal enters the third light-transmitting medium 46 at an angle $\theta_2$ relative to normal$_1$. The light signal approaches the correction side 50 at an angle $\theta_2$ relative to normal$_2$. The light signal exits the third light-transmitting medium 46 at an angle $\theta_4$ relative to normal$_1$.

The wedge 44 is configured such that the light signal exits the correction side 50 traveling in a direction that is substantially perpendicular to the plane of the device. For instance, the light signal exits the correction side 50 traveling in a direction that is substantially perpendicular to a side of the base 18 or to a side of a substrate 28 and/or is parallel to normal$_1$. As an example, the light signal exits the correction side 50 traveling in a direction that is at an angle $\lambda$ in a range of 88-92° measured relative to the top side of the base 18, the bottom side of the base 18, the top side of the substrate 28, and/or the bottom side of the substrate 28; or in a range of 89-91° measured relative to the top side of the base 18, the bottom side of the base 18, the top side of the substrate 28, and/or the bottom side of the substrate 28; or in a range of 89.5-90.5° measured relative to the top side of the base 18, the bottom side of the base 18, the top side of the substrate 28, and/or the bottom side of the substrate 28. Additionally or alternately, the wedge 44 is configured such that the light signal exits the correction side 50 traveling in a direction that is toward a location above the device and is also substantially perpendicular to a direction of propagation of light signals through the waveguide 16. As an example, the light signal exits the correction side 50 traveling in a direction that is toward a location above the device and is also at an angle $\lambda$ in a range of 88-92° measured relative to a direction of propagation the light signals through the waveguide; or in a range of 89-91° measured relative to a direction of propagation the light signals through the waveguide; or in a range of 89.5-90.5°, or in a range of 88-92° measured relative to a direction of propagation the light signals through the waveguide. For the purposes of illustration, FIG. 2D illustrates the angle $\lambda$ measured relative to the bottom of the base 18 or substrate 28 and also relative to the direction of propagation.

Since the wedge provides the substantially perpendicular direction, the reflecting side in the port can have an angle other than 45°. As a result, the system allows the non-45° surfaces that result from wet-etching crystalline materials to be employed as the reflecting side in a port, to support the reflecting side in a port or to at least partially define the reflecting side in a port.

The geometry for the wedge 44 can be calculated or approximated from the principles of physics. For instance, $n_2$, $n_3$, $\theta_1$ and $\theta_2$ are related by Snell's law. Additionally, $n_3$, $n_4$, $\theta_3$ and $\theta_4$ are also related by Snell's law. The principles of geometry combined with these relationships shows that the angle $\phi$ of the interface side 48 relative to the correction side 50 can be calculated or approximated from $$\tan\phi = \frac{-n_2\cos 2\alpha}{\sqrt{n_3^2 - n_2^2\cos^2 2\alpha} - n_4}.$$

Suitable materials for the third light-transmitting medium 46 include, but are not limited to, silica, silicon nitride and silicon. In many instances, it may be desirable for the third light-transmitting medium 46 to have a higher index of refraction than the second light-transmitting medium ($n_3 > n_2$). This relationship can result in a lower value of angle $\phi$. Suitable materials for the fourth light-transmitting medium 26 include, but are not limited to, solids, liquids, or gasses such as air, silica or polymers. In some instances, the fourth light-transmitting medium 26 also acts as a cladding for waveguide and/or the device. When the first light-transmitting medium 20 is silicon, a suitable fourth light-transmitting medium 26 includes silica. Suitable materials for the fifth light-transmitting medium 52 include, but are not limited to, solids, liquids, or gasses such as air, silica or polymers.

The port recess 29 includes an optional reflecting medium 56 to enhance reflection of the light signal in the port recess 29. FIG. 2D shows the reflecting medium 56 on the bottom side 30 and on the reflecting side 34. The reflecting medium 56 can be positioned on the entire bottom side 30 or a part of the bottom side 30. Additionally or alternately, the reflecting medium 56 can be positioned on the entire reflecting side 34 or on a part of the reflecting side 34. Suitable reflecting media include, but are not limited to, reflective metals such as Al and Au.

Figure 2E:
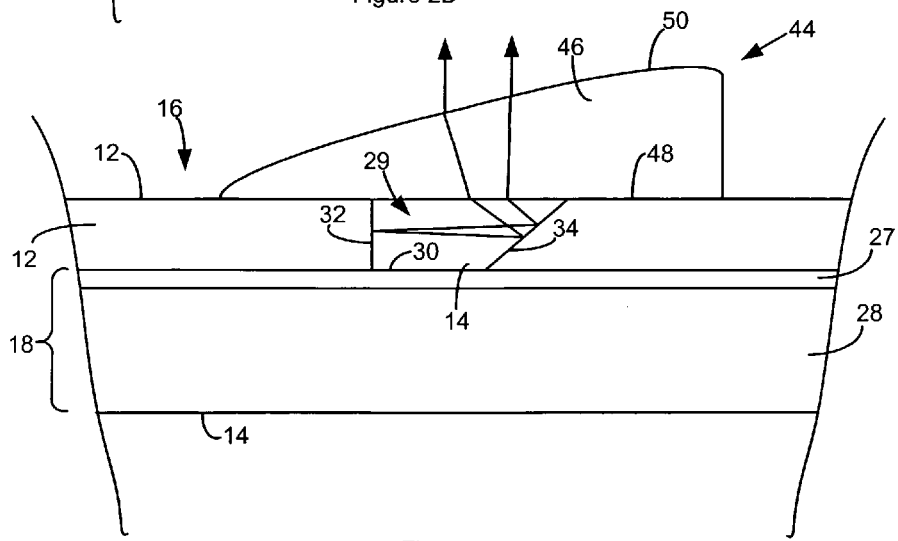
FIG. 2E illustrates a wedge positioned on the optical device of FIG. 2A through FIG. 2C and having a curved side.

Suitable construction of a port according to FIG. 2A through FIG. 2D is provided in U.S. patent application Ser. No. 11/881,745, filed on Jul. 27, 2007, entitled "Efficient Transfer of Light Signals Between Optical Devices," and incorporated herein in its entirety. Although FIG. 2D shows the correction side 50 as being planar, the correction side can be non-planar as illustrated in FIG. 2E. As disclosed in U.S. patent application Ser. No. 11/881,745, the non-planar correction side can be configured to correct the light signal for a variety of optical effects such as diffraction.

Figure 3A:
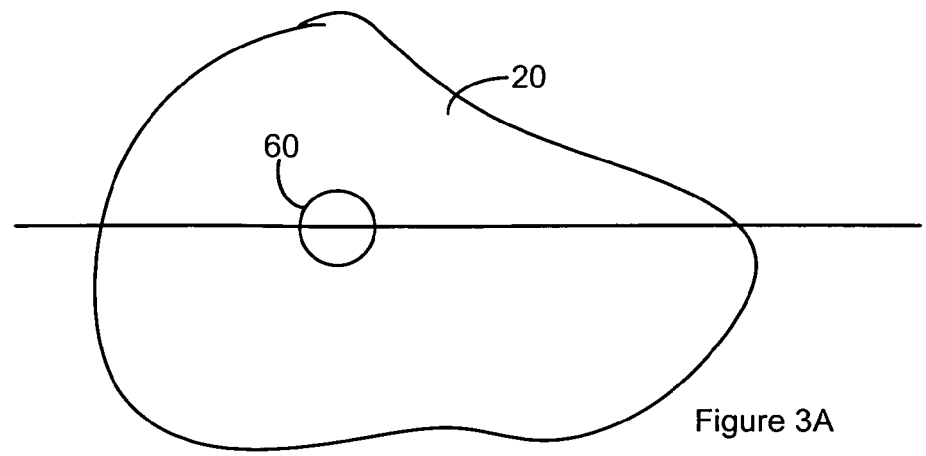
FIG. 3A through FIG. 3B illustrate a portion of an optical device constructed according to FIG. 1A through FIG. 1C and having an optical via.
Figure 3B:
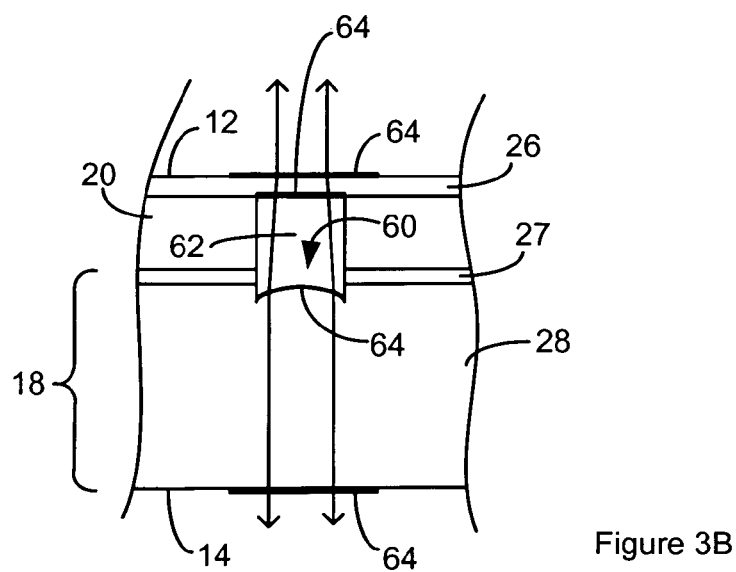

As noted above, a via is an example of an optical component that can be included on an optical device. FIG. 3A through FIG. 3B illustrate a portion of an optical device that includes an optical via. FIG. 3A is a topview of the optical device where the fourth light-transmitting medium 26 is treated as transparent and is accordingly not visible in FIG. 3A. FIG. 3B is a cross-section of the device shown in FIG. 3A taken along the line labeled B.

The device includes a recess 60 extending into the first light-transmitting medium 20 and through the optical insulator 27. The recess 60 serves as a via that provides an optical pathway through the device. For instance, the recess 60 provides an optical pathway from the top side 12 of the device to the bottom side 14 of the device or from the bottom side 14 of the device to the top side 12 of the device. A sixth light-transmitting medium 62 is positioned in the recess 60. In some instances, the sixth light-transmitting medium 62 fills the recess 60. When the first light-transmitting medium 20 is silicon, a suitable sixth light-transmitting medium 62 includes polymers, spin-on glasses and evaporated or sputtered films. A layer of the fourth light-transmitting medium 26 can be positioned over the sixth light-transmitting medium 62 in the recess 60.

The interface between the substrate 28 and the sixth light-transmitting medium 62 can be planar or curved. The illustrated interface is curved and can be configured as a lens. For instance, the interface can be curved so as to collimate the light signal or to converge the light signal as the light signal travels through the fourth light-transmitting medium 26. For instance, FIG. 3B illustrates the interface configured to converge the light signal as the light signal travels through the sixth light-transmitting medium 62.

As evident in FIG. 3B, a portion of the base 18 acts as a facet through which a light signal traveling through the via enters the device or exits the device. This facet can optionally be coated with an anti-reflective coating 64 to discourage reflection of light signals entering the device or exiting the device. When the portion of the base 18 acting as a facet is constructed of silicon, a suitable anti-reflective coating 64 includes, but is not limited to, single-layer coatings such as silicon nitride or aluminum oxide, or multilayer coatings which may contain silicon nitride, aluminum oxide, and/or silica. Additionally, a portion of the fourth light-transmitting medium 26 acts as a facet through which a light signal traveling through the via enters the device or exits the device. This facet can optionally be coated with an anti-reflective coating 64 to discourage reflection of light signals entering the device or exiting the device. When the fourth light transmitting is constructed of silica, a suitable single-layer anti-reflective coating 64 includes, but is not limited to, magnesium fluoride. A portion of the fourth light-transmitting medium 26 acts as a facet through which a light signal traveling through the via enters the sixth light-transmitting medium 62 or exits the sixth light-transmitting medium 62. This facet can optionally be coated with an anti-reflective coating 64 to discourage reflection of light signals entering the device or exiting the device. When the fourth light transmitting is constructed of silica and the sixth light-transmitting medium 62 is air, a suitable anti-reflective coating 64 includes, but is not limited to, magnesium fluoride. A portion of the sixth light-transmitting medium 62 acts as a facet through which a light signal traveling through the via enters the substrate 28 or exits the substrate 28. This facet can optionally be coated with an anti-reflective coating 64 to discourage reflection of light signals entering the device or exiting the device. When the sixth light transmitting is air and the substrate 28 is constructed of silicon, a suitable anti-reflective coating 64 includes, but is not limited to, silicon nitride, aluminium oxide and silica.

Although FIG. 3B illustrates the recess 60 extending past the optical insulator 27 so that there is no optical insulator 27 present in the optical path provided by the recess 60, the recess 60 need not extend past the optical insulator 27. However, extension of the recess 60 past the optical insulator 27 can reduce the number of material interfaces experienced by the light signal as the light signal travels through the via and can accordingly reduce optical loss. Combining the reduced number of material interfaces combined with anti-reflective coatings 64 can further reduce the level of optical loss caused by the via.

Figure 4:
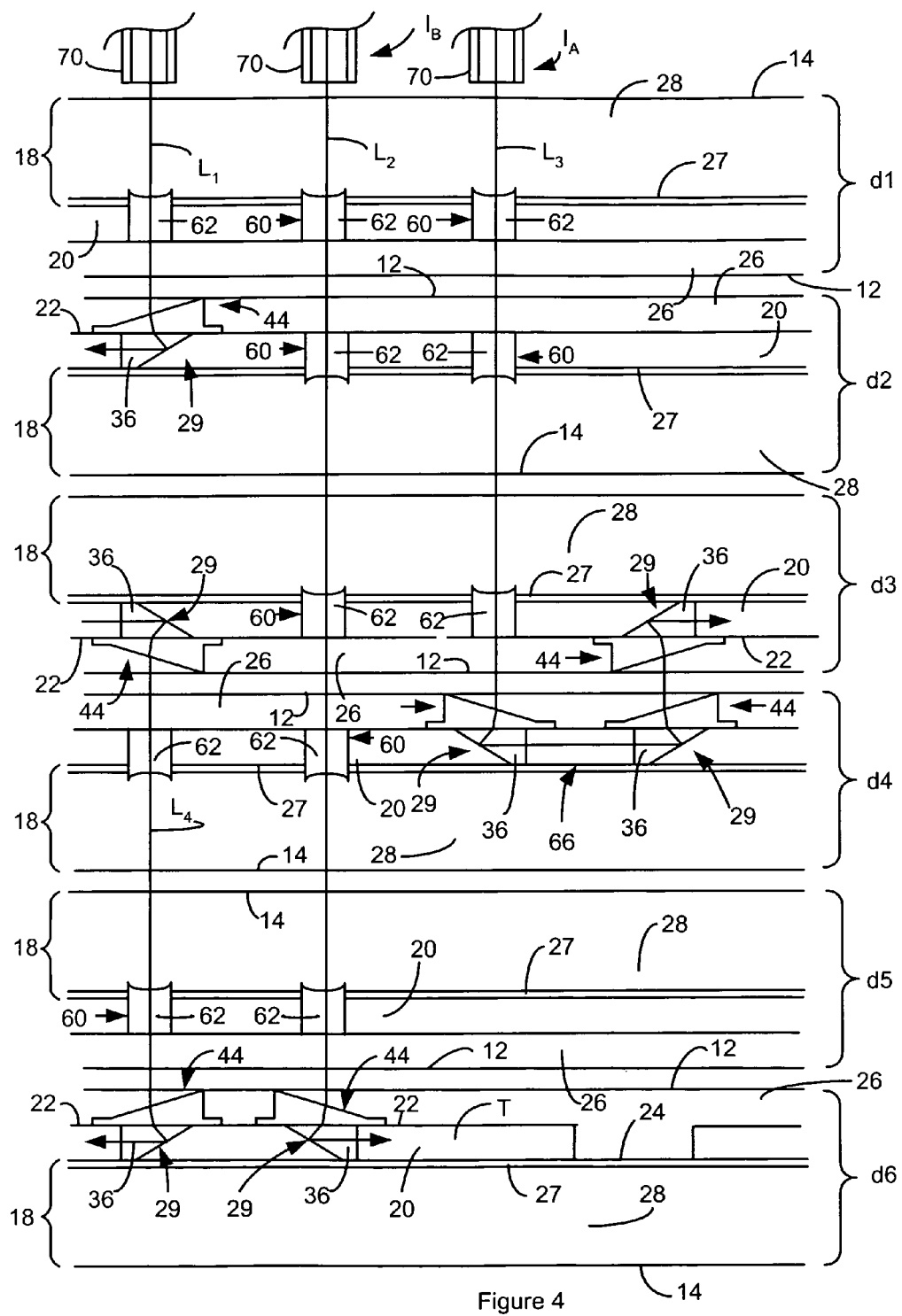
FIG. 4 illustrates a system that includes a plurality of devices constructed with ports and vias according to FIG. 1A through FIG. 3B and arranged such that a light signal from outside of the system or from inside of the system can be routed between different devices in the system.

FIG. 4 illustrates a system that includes a plurality of the devices. The illustrated system includes six device labeled d1 through d6. The devices are positioned such that each device has a top side 12 that is adjacent to the top side 12 of another device and/or has a bottom side 14 that is adjacent to the bottom side 14 of another device. Each device is positioned to receive a light signal from at least one of the other devices and/or each device is configured to output a light signal that is received by another one of the devices.

In FIG. 4, the devices are illustrated as being separated by a gas such as air or such as the ambient atmosphere in which the devices are placed. However, the devices can be separated by a solid material. In some instances, when the system includes a solid between adjacent devices, the system can be identified by the repeating materials that are associated with repeating component platforms. For instance, the system can be identified by the repeating materials of a silicon-on-insulator wafer since each of the silicon-on-insulator wafers includes a silica insulator between a silicon substrate and another silicon layer for guiding of waveguides. The repeating pattern of dimension for the repeating materials can also be present in the system. For instance, the silica insulator, silicon substrate and silicon layer for guiding of waveguides will have about the same thickness on each of the devices.

The device labeled d1 (device d1) includes three vias constructed according to FIG. 3A through FIG. 3B. The device d2 includes two vias constructed according to FIG. 3A through FIG. 3B and a port constructed according to FIG. 2A through FIG. 2E. The device d3 includes two vias constructed according to FIG. 3A through FIG. 3B and two port constructed according to FIG. 2A through FIG. 2E. The device d4 includes two vias constructed according to FIG. 3A through FIG. 3B and two ports constructed according to FIG. 2A through FIG. 2E. The device d5 includes two vias constructed according to FIG. 3A through FIG. 3B. The device d6 includes two ports constructed according to FIG. 2A through FIG. 2E. FIG. 4 shows only a portion of each device, as a result, the devices can include other optical components for processing of light signals such as the optical components discussed in the context of FIG. 1A through FIG. 1C. Additionally, each device can include additional ports and vias that are not evident in FIG. 4. Some of the details that are evident in FIG. 2A-3B are not evident in FIG. 4 in order to simplify the illustration. For instance, anti-reflective coatings 64 that are present in the via of FIG. 3B are not evident in the vias illustrated in FIG. 4.

The ports and vias can be arranged such that a light signal can be routed from any one of the devices to a waveguide on any one of the other devices. Alternately, the ports and vias can be arranged such that a light signal that the system receives from outside the system can be routed to any one of the devices. For instance, the device d1 can receive the light signal labeled L1 (light signal L1) from outside of the system and route the light signal L1 to the device d2. In particular, the device d1 receives the light signal L1 from outside of the system, the light signal L1 travels through a via in device d1 and is received at the port in the device d2. The port in the device d2 directs the light signal L1 into a waveguide on device d2. As a result, the system routes a light signal from outside of the system into a waveguide on device d2. The system can also route a light signal received from outside of the system to a device located deeper in the system. For instance, FIG. 4 shows device d1 receiving light signal L2 from outside of the system and routing light signal L2 to device d6.

Light signal L1 and light signal L2 are each received from outside of the system and routed to an optical device where the first interaction between the light signal and the device is between the light signal and the top side 12 of the device. The system can employ a device having a return waveguide to route light signals received from outside of the system to an optical device arranged so the first interaction between the light signal and the device is between the light signal and the bottom side 14 of the device. For instance, device d4 includes a return waveguide 66 that returns light signal L3 to device d3. In particular, light signal L3 is received from outside of the system and travels through aligned vias in device d1, d2, and d3. The light signal L3 travels through the via in d3 and is received at the port in device d4. The port in device d4 directs light signal L3 to a return waveguide 66 that carries light signal L3 to a second port that directs lights signal L3 to a port on device d3. The port on device d3 directs the returned light signal to a waveguide on device d3. As a result, the first interaction between light signal L3 and device d3 occurs when light signal L3 travels through the via in device d3, however, the return waveguide 66 and ports in device d4 return lights signal L3 to device d3.

As an alternative to a return waveguide, ports are known that direct light signals from a waveguide on a device to locations below a device or that receive light signals from below the device and direct the light signals into a waveguide on the device. The system can employ ports with this alternate construction to eliminate the use of a return waveguide. For instance, the via in device d4 that receives light signal L3 could be replaced with a port having this alternate construction in order to eliminate the return waveguide illustrated in FIG. 4.

Although FIG. 4 illustrates the system receiving light signals from outside of the system, the light signal can originate within the system. For instance, one or more of the devices can include a light source such as a laser. The light source can serve as a source of a light signal that is routed within the system. As a result, a light signal can be routed between devices in the system. As an example, device d3 can be configured to process light signal L4 and then direct light signal L4 to a waveguide that carries light signal L4 to a port on device d3. The port on device d3 can direct the light signal to device d4 where light signal L4 travels through a via in device d4, through a via on device d5, to a port on device d6. The port on device d6 can direct light signal L4 into a waveguide on device d6. The waveguide on device d6 can carry light signal L4 to a component for additional processing.

Although many of the waveguides in FIG. 4 are shown as having a length that is parallel to the plane of the page, the waveguides can turn into the page and/or out of the page as illustrated by the waveguide labeled T on device d6. The waveguide labeled T appears to suddenly terminate in FIG. 4, however, this termination can result from the waveguide labeled T turning into the page or out of the page.

As evident in FIG. 4, a via in one device must be horizontally aligned with a via or port on an adjacent device. The alignment can be achieved using alignment techniques and structures disclosed in U.S. patent application Ser. No. 11/881,745. For instance, the top side 12 and/or bottom side 14 of each device can include an alignment recess that extends into the device. Adjacent devices can then be horizontally aligned by placing an alignment structure in an alignment recess on each of the devices. As a result, the alignment structure will span the alignment recesses on adjacent devices. Examples of suitable alignment structures include balls, spheres, rods, and cylinders.

The ports on each of the devices in FIG. 4 include a wedge 44. As disclosed in the context of FIG. 3A through FIG. 3E, these wedges 44 can be configured to makes the light travel away from a device in a direction that is substantially perpendicular to the device. Additionally, since the optical devices in the system can be substantially parallel to each other, the use of these wedges 44 can encourage the light signals to enter and/or exit the vias in a direction that is substantially perpendicular to the device that includes the via. For instance, the system can be constructed such that the light signals enter or exit a via at an angle in a range of 88° to 92° relative to a plane defined by a bottom side 14 of the device having the via. As a result of the substantially perpendicular direction that the light signal travels away from the devices and/or toward the devices, the effects of variable displacement between adjacent devices can be greatly reduced or eliminated. As a result, the system is not associated with substantial vertical alignment issues.

Although the portion of device d1 shown in FIG. 4 does not illustrate any waveguides, in accordance with device d2 through device d4 each including vias and waveguides, the device d1 can include one or more waveguides in addition to the illustrated vias.

Although the system illustrated in FIG. 4 includes six devices, the system can include other numbers of devices. For instance, the system can include more than six devices. In some instances, the system includes two or more devices, three or more devices, or six or more devices.

Although FIG. 4 illustrates devices positioned such that each device has a top side 12 that is adjacent to the top side 12 of another device and/or has a bottom side 14 that is adjacent to the bottom side 14 of another device, the devices can be arranged such that one or more of the devices has a top side 12 that is adjacent to the bottom side 14 of another device. For instance, a first one of the devices can have a top side 12 that is adjacent to the bottom side 14 of a second one of the devices. The first device can include a port that directs the light signal through a via included on the second device. Additionally, although the system is disclosed in the context of ports that direct light signals to locations above the devices, ports are known that direct light signals from a waveguide on a device to locations below a device or that receive light signals from below the device and direct the light signals into a waveguide on the device. The system can employ ports with this alternate construction to permit the top side 12 of one device to be positioned adjacent to the bottom side 14 of another device. Further, ports with this alternate construction can be employed with these ports to provide light signals that exit the device in a direction that is substantially perpendicular to the device and is also in a direction toward a location under the device.

Although FIG. 4 illustrates light signals traveling through the system in a particular direction and the associated text describes the light signal as traveling in the illustrated direction, the illustrated direction is for illustrative purposes and the system can be operated with one or more of the light signals traveling through the system in the opposite direction. Although FIG. 4 is described in the context of light signals traveling a particular direction through the system, the system can be operated with one or more of the light signals traveling through the system in the opposite direction.

Figure 5B:
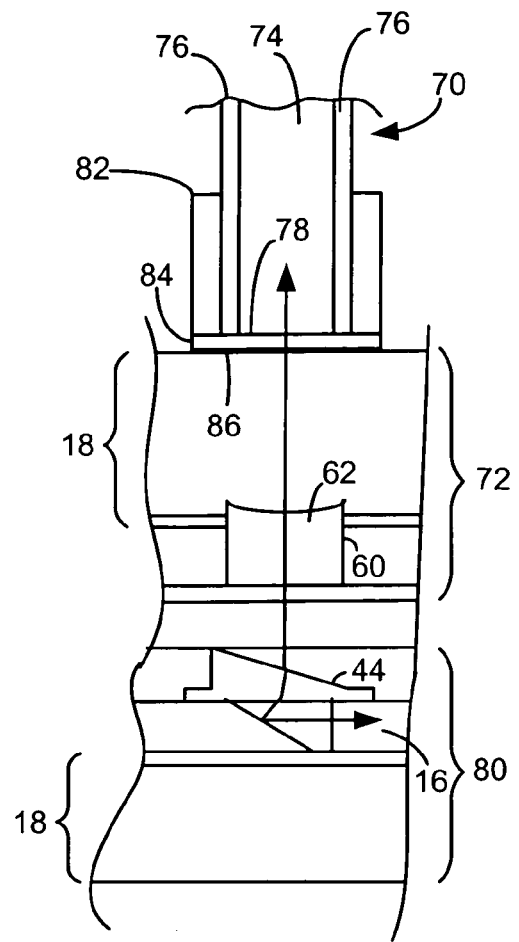
FIG. 5A and FIG. 5B illustrate an example of an interface between an optical fiber and a first device included in a system such as the system of FIG. 4.
Figure 5A:
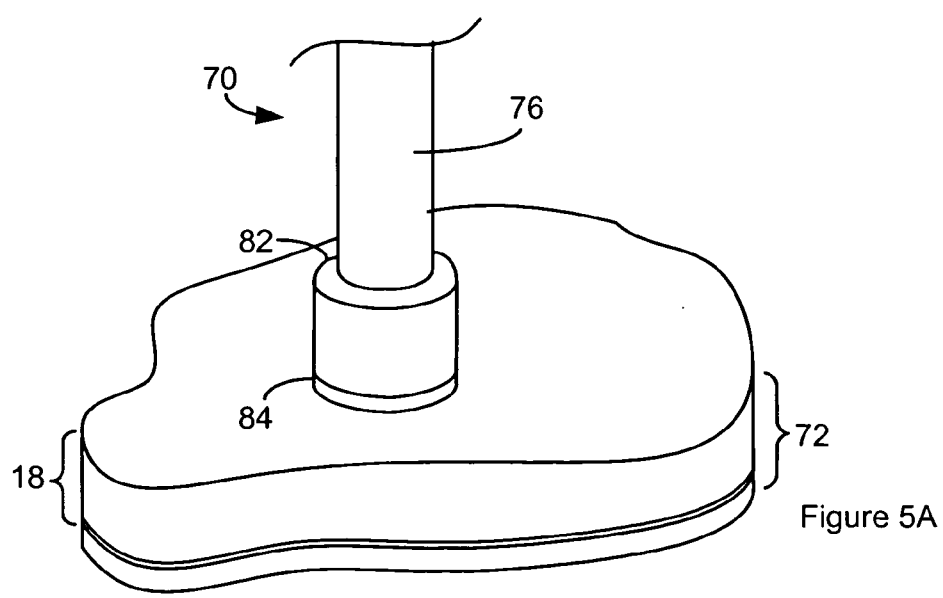

FIG. 4 illustrates optical fibers 70 that each carry light signals to and/or from the optical system. The light signals each travel through a via in device d1 when being exchanged between the optical fiber 70 and a second device 80 (device d2-device d6) in the system. FIG. 5A and FIG. 5B illustrate an example of an interface between the optical fiber 70 and a first device 72 included in a system such as the system of FIG. 4. FIG. 5A is a perspective view of the interface. FIG. 5B shows a cross section of the device and fiber 70 shown in FIG. 5A in combination with a cross section of a second device 80 included in the system. The cross section of FIG. 5B is taken through the axis of the optical fiber 70.

The interface includes an optical fiber 70 having a core 74 and a cladding 76. An end of the optical fiber 70 includes a facet 78 through which light signals can enter and/or exit the optical fiber 70. The facet 78 is aligned with a via in the first device 72 and is immobilized relative to the via. The via can be constructed according to FIG. 3A through FIG. 3B. The anti-reflective coating 64 evident in FIG. 3B are not shown in the interface of FIG. 5A and FIG. 5B in order to simplify the illustration. The via in the first device 72 is optically aligned with a wedge 44 and port in a second device 80. The port is configured to direct light signals from a waveguide 16 on the second device 80 to the wedge 44. The wedge 44 is configured such that light signals that exit the waveguide and then travel through the port and wedge 44 exit the second device 80 traveling in a direction that is substantially perpendicular to the plane of the first device 72. As a result, the light signals from the waveguide on the second device 80 exit the second device 80, travel through the via in the first device 72 and enter the optical fiber 70 aligned with the via through the facet 78. Alternately, light signals from the optical fiber 70 can exit the optical fiber 70 through the facet 78, travel through the via in the first device 72, and into the waveguide 16 on the second device 80.

As is evident from FIG. 5B, the interface is constructed such that the direction of propagation of light signals through the core 74 of the waveguide at the facet 78 is substantially perpendicular to plane of the first device 72. As is evident from FIG. 5B, the portion of the optical fiber 70 closest to the first device 72 can be substantially perpendicular to plane of the first device 72. This substantially perpendicular orientation permits for a high density of optical fibers 70 to be used in conjunction with the system. Additionally, this substantially perpendicular orientation permits a wide range of possibilities for the location of the optical fiber 70 on the system and accordingly allows a light signal to enter and/or exit the system in a location near where the light signal is processed by the system.

The interface includes a holder 82 configured to hold the optical fiber 70. In some instances, the holder 82 surrounds the optical fiber 70. A suitable holder 82 includes, but is not limited to, a ferrule. A seventh light-transmitting medium 84 can be positioned between the facet 78 and the first device 72. In some instances, the seventh light-transmitting medium 84 is also positioned between the holder 82 and the first device 72. Suitable seventh light-transmitting media include, but are not limited to, index matching materials and materials that immobilize the facet 78 relative to the first device 72 such as epoxies. In a preferred embodiment, the wedge 44 and the substrate 28 are made of the same material while the wedge and the seventh light-transmitting medium 84 are made of different materials in order to provide the desired re-direction of the light signals. In one example, the wedge 44 and the substrate 28 are each silicon.

An anti-reflective coating 86 can be positioned at the interface between the seventh light-transmitting medium 84 and the first device 72. A suitable anti-reflective coating 86 includes, but is not limited to, single-layer coatings such as silicon nitride or aluminum oxide, or multilayer coatings which may contain silicon nitride, aluminum oxide, and/or silica.

Figure 5C:
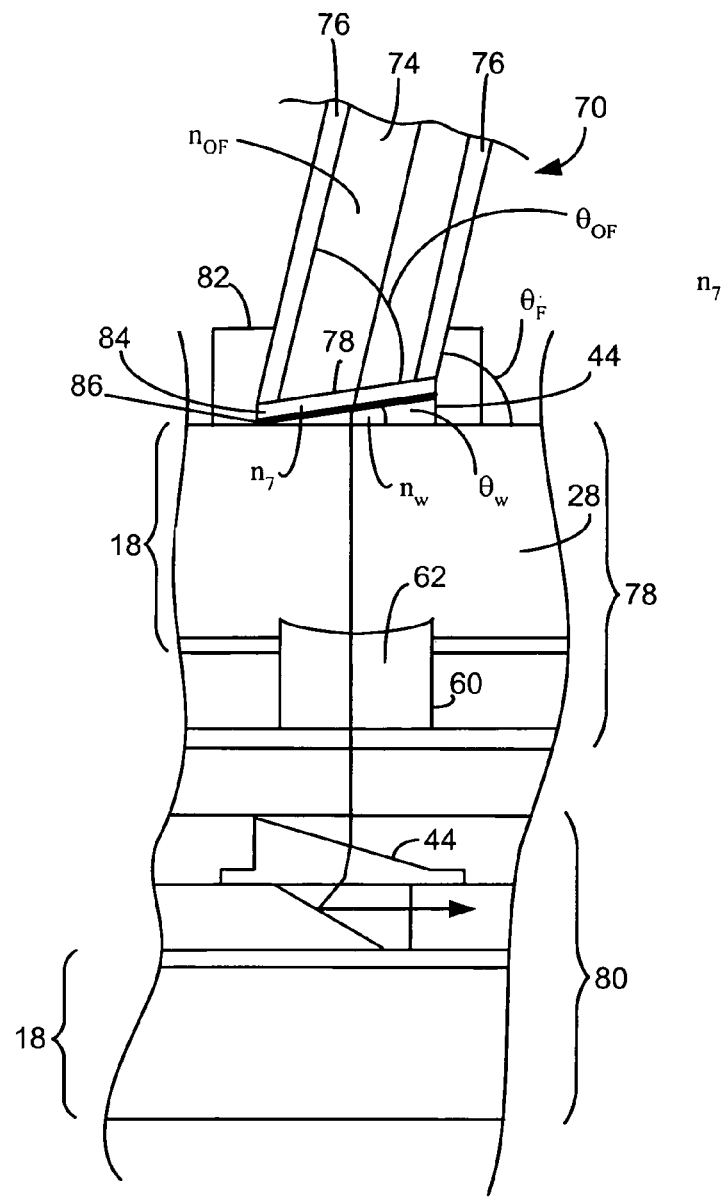
FIG. 5C illustrates the interface of FIG. 5A and FIG. 5B employing an optical fiber having a facet angled at less than 90° relative to the axis of the optical fiber.

The facet 78 of the optical fiber 70 can be angled at less than 90° relative to the axis of the optical fiber 70 in order to reduce the effects of back reflection. FIG. 5C illustrates the interface of FIG. 5A and FIG. 5B employing an optical fiber 70 having a facet 78 angled at less than 90° relative to the axis of the optical fiber 70. The first device 72 includes a wedge 44 between a seventh light-transmitting medium 84 and the base 18 of the first device 72. The seventh light-transmitting medium 84 can be between the facet 78 of the optical fiber and the wedge 44. When the system is operated so light signals travel from the second device 80 to the optical fiber 70, the wedge 44 is constructed to change the direction that the light signal travels so that after passing through the facet 78, the light signals are traveling in a direction that is substantially parallel to the direction of propagation of light signals through the optical fiber 70. When the system is operated so light signals travel from the optical fiber 70 to the second device 80, the wedge 44 is constructed to change the direction that the light signal travels so that after passing through the wedge, the light signals are traveling in a direction that is substantially perpendicular to plane of the first device 72.

The geometry for the wedge 44 can be calculated or approximated from the principles of physics. As is evident in FIG. 5C, the index of refraction for the seventh light-transmitting medium 84, the wedge 44, and the core 74 of the optical fiber 70 are respectively represented by $n_7$, $n_w$, $n_{OF}$. Additionally, the angle of the facet 78 relative to the axis of the optical fiber 70 is represented by $\theta_{OF}$ and the angle of the wedge incline is represented by $\theta_w$. These variables are related by Snell's law. The principles of geometry combined with these relationships shows that $\theta_w$ can be calculated or approximated from $n_w \sin \theta_w = n_7 \sin(\theta_w + 90° - \theta_{OF})$.

An anti-reflective coating 86 can be positioned at the interface between the seventh light-transmitting medium 84 and the wedge. A suitable anti-reflective coating 86 includes, but is not limited to, single-layer coatings such as silicon nitride or aluminum oxide, or multilayer coatings which may contain silicon nitride, aluminum oxide, and/or silica.

Suitable materials for the wedge 44 include, but are not limited to, silicon, silicon nitride, and silica. Suitable materials for the seventh light-transmitting medium 84 include, but are not limited to, silica or polymer epoxy.

Figure 6A:
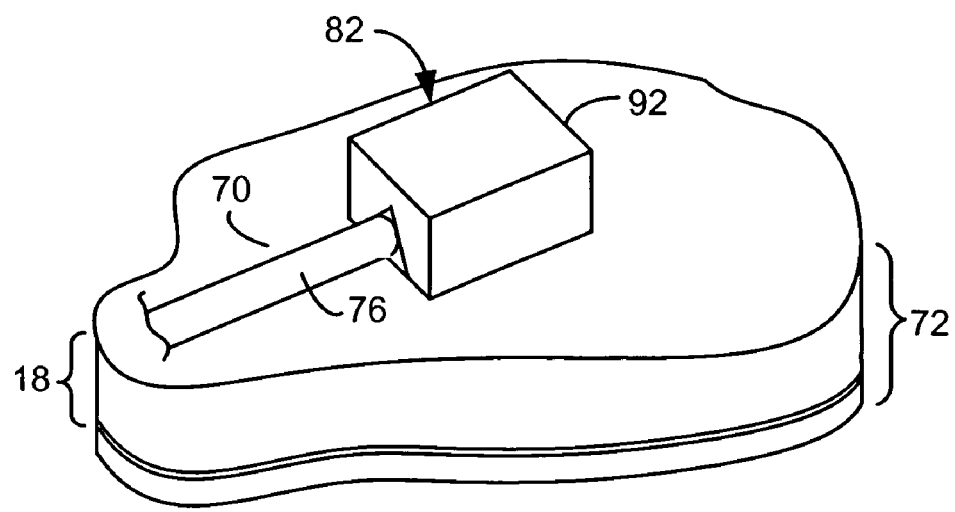
FIG. 6A through FIG. 6C illustrate an example of an interface between an optical fiber and a first device included in a system such as the system of FIG. 4.
Figures 6B, 6C:
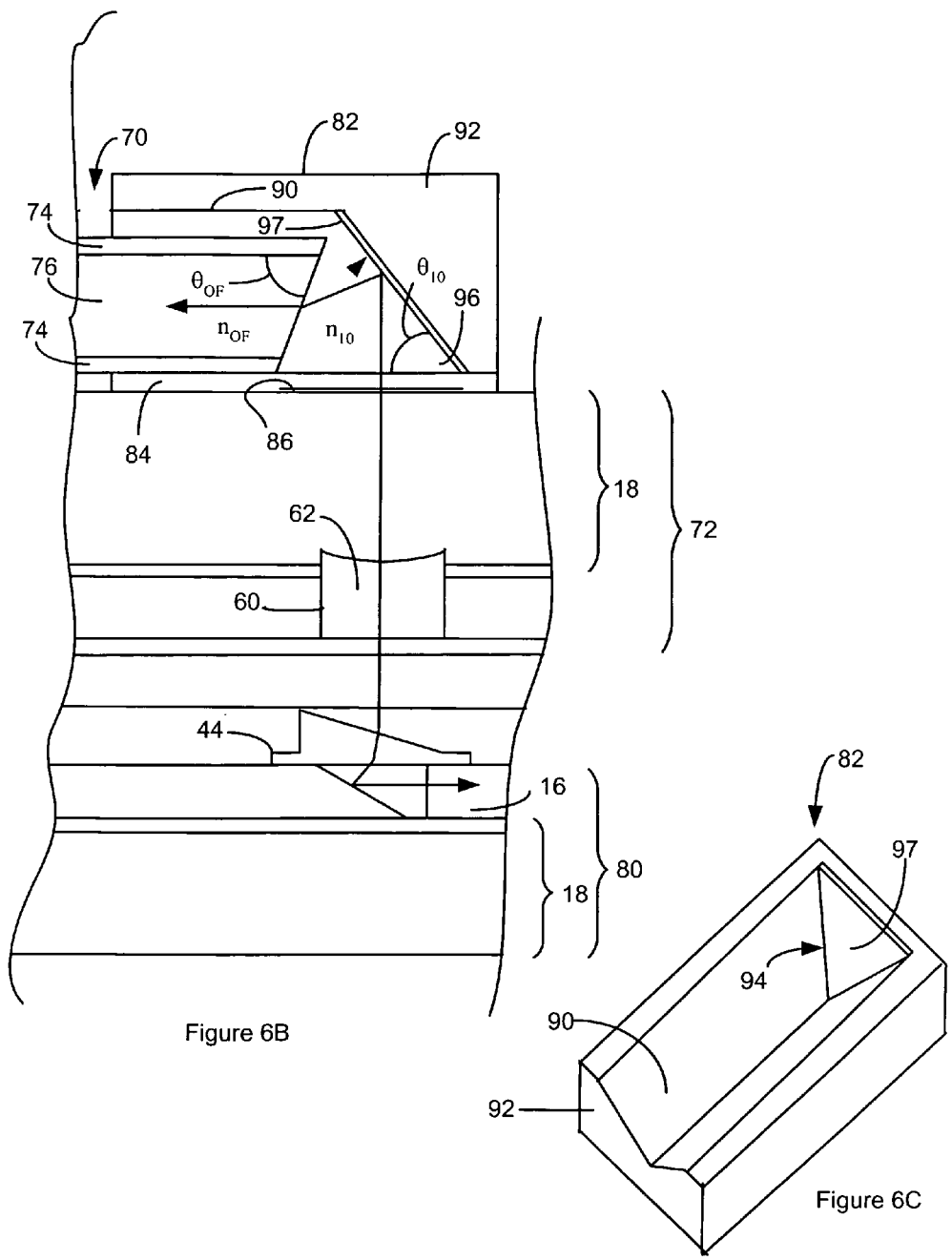

As is evident from FIG. 5C, the portion of the optical fiber 70 closest to the first device 72 can be angled at less than 90° relative to plane of the first device 72. For instance, the portion of the optical fiber 70 closest to the first device 72 can have an angle ($\theta_F$) relative to the plane of the first device in a range of angles greater than 1°, 3°, 4°, or 5°, and/or less than 20°, 10°, 9°, or 8°. At these angles, $\theta_F$, a high optical fiber density can be achieved by providing different optical fibers with substantially the same rotational orientation. Similar angles, can prevent and/or reduce the need of the optical fibers to cross one as they approach the optical devices or next to the optical devices The interface between an optical fiber 70 and the first device 72 can be constructed such that the portion of the optical fiber 70 closest to the first device 72 is substantially parallel to plane of the first device 72. For instance, FIG. 6A through FIG. 6C illustrate an example of an interface between the optical fiber 70 and a first device 72 included in a system such as the system of FIG. 4. FIG. 6A is a perspective view of the interface. FIG. 6B shows a cross section of the device and fiber 70 shown in FIG. 6A in combination with a cross section of a second device 80 included in the system. The cross section is taken through the axis of the optical fiber 70. FIG. 6C is a perspective view of a holder 82 that holds the optical fiber 70 as shown in FIG. 6A and FIG. 6B.

The interface includes an optical fiber 70 having a core 74 and a cladding 76. An end of the optical fiber 70 includes a facet 78 through which light signals can enter and/or exit the optical fiber 70. The end of the optical fiber 70 is positioned in a holder 82. The holder 82 includes a trench, recess, or v-groove 90 in a body 92. A surface of the body 92 is modified to act as a reflecting side 94 that reflects light signals. The optical fiber 70 is positioned in the recess 90 such that the facet 78 of the optical fiber 70 is aligned with the reflecting side 94. The alignment of the facet 78 and the reflecting side 94 is such that a light signal that exits the optical fiber 70 through the facet 78 is incident on the reflecting side 94. The holder 82 can include a tenth light-transmitting medium 96 between the facet 78 and the reflecting side 94. The holder 82 is positioned on the system such that the reflecting side 94 is aligned with a via in the first device 72 and is immobilized relative to the via. For instance, the reflecting side 94 is aligned with the via such that a light signal that exits the optical fiber 70 through the facet 78 is reflected off of the reflecting side 94 and then travels through the via. The via can be constructed according to FIG. 3A through FIG. 3B. The anti-reflective coating 64 evident in FIG. 3B are not shown in the interface of FIG. 6A through FIG. 6C in order to simplify the illustration.

The via in the first device 72 is optically aligned with a wedge 44 and port in a second device 80. As described above, the wedge and port are configured such that a light signal that travels through the via in the first device 72 and then through the wedge 44 and a port in the second device 80 are directed into the waveguide traveling in a direction that is substantially parallel to the axis of the waveguide (parallel to the direction of propagation of light signals through the waveguide). As a result, the light signals from the optical fiber 70 exit the optical fiber 70, are reflected off the reflecting side 94, and then travel through the via in the first device 72, the wedge 44 on the second device 80, the port on the second device 80 and enter the waveguide on the second device 80. Alternately, the system can be operated such that light signals from the waveguide on the second device 80 travel through the port and wedge 44 on the second device 80, and through the via on the first device 72, are reflected off the reflecting side 94 on the holder 82 and enter the optical fiber 70.

As is evident from FIG. 6B, the reflecting side 94 and the facet 78 of the optical fiber 70 are constructed such that the light signals that exit from the optical fiber 70 enter the first device 72 in a direction that is substantially perpendicular to the first device 72. As such, the reflecting side 94 and the facet 78 of the optical fiber 70 are also constructed such that the light signals that exit from the first device 72 and are reflected off the reflecting side 94 enter the optical fiber 70 traveling in a direction that is substantially parallel to the axis of the optical fiber 70 (or parallel to the direction of propagation of light signals along the optical fiber 70). The angles of the facet 78 and the reflecting side 94 can be calculated or approximated from the principles of physics. As is evident in FIG. 6B, the index of refraction for the tenth light-transmitting medium 96 and the core 74 of the optical fiber 70 are respectively represented by $n_{10}$, and $n_{OF}$. Additionally, the angle of the facet 78 relative to the axis of the optical fiber 70 is represented by $\theta_{OF}$ and the angle of the reflecting side 94 relative to the plane of the first device 72 is represented by $\theta_{10}$. Snell's law can be employed to approximate the angle $\theta_{OF}$.

A seventh light-transmitting medium 84 can be positioned between the tenth light-transmitting medium 96 and the first device 72. In some instances, the seventh light-transmitting medium 84 is also positioned between the holder 82 and the first device 72. Suitable seventh light-transmitting media include, but are not limited to, index matching materials and materials that immobilize the facet 78 relative to the first device 72 such as epoxies. In some instances, the tenth light-transmitting medium 96 is configured to immobilize the end of the optical fiber 70 in the holder 82. Suitable tenth light-transmitting media include, but are not limited to, silica or polymer epoxy. In some instances, the tenth light-transmitting material and the seventh light-transmitting material are the same material. For instance, the material used as the tenth light-transmitting material can serve as the seventh light-transmitting material. In these instances, the tenth light-transmitting material can optionally be continuous so there is no interface between different regions of the tenth light-transmitting material.

An anti-reflective coating 86 can be positioned at the interface between the seventh light-transmitting medium 84 and the first device 72. A suitable anti-reflective coating 86 includes, but is not limited to, single-layer coatings such as silicon nitride or aluminum oxide, or multilayer coatings which may contain silicon nitride, aluminum oxide, and/or silica.

Suitable materials for the body 92 of the holder 82 include, but are not limited to silicon or silica. The reflecting side 94 can be created by forming a layer of reflecting material 97 on a surface of the body 92. Suitable layers of reflecting material 97 include, but are not limited to, Al, Au, and Ag. The recess 90 can be etched in the body 92. When the body 92 is constructed of a crystalline material such as silicon, the angle of the reflecting side 94 can be a natural result of etching the crystalline material.

Figure 7:
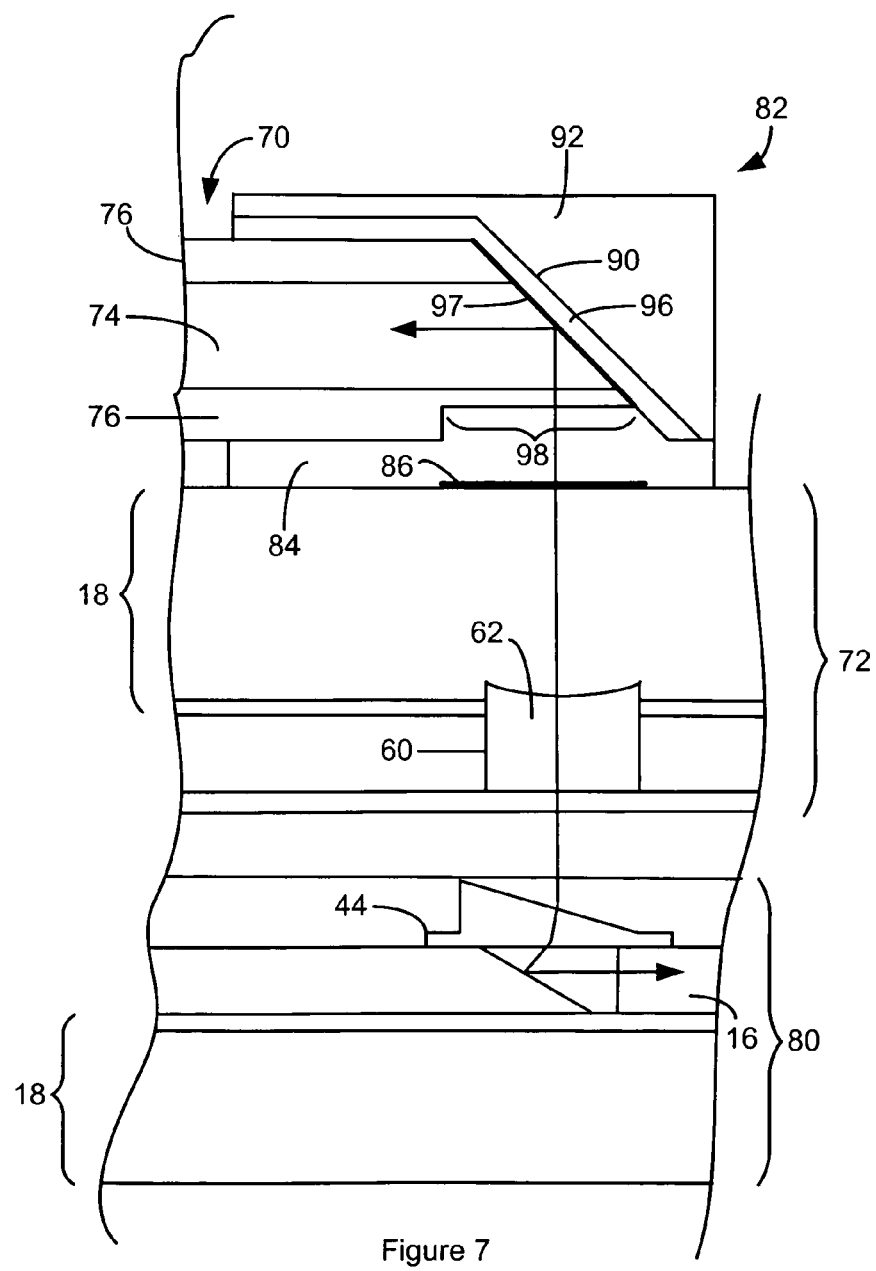
FIG. 7 is a cross section of an interface where the facet of the optical fiber serves as a reflecting side.

As an alternative to forming a reflecting side 94 on a holder 82, the facet 78 of the optical fiber 70 can be configured to serve as a reflecting side 94. For instance, FIG. 7 is a cross section of an interface where the facet 78 of the optical fiber 70 serves as the reflecting side 94. The cross section is taken through the axis of the optical fiber 70.

The optical fiber 70 includes a core 74, a cladding 76, and a facet 78 through which light signals can enter and/or exit the optical fiber 70. A portion of the optical fiber 70 cladding 76 can be removed to form a window 98 in the side of the optical fiber 70. For instance, the cladding 76 can be polished to remove all or a portion of the cladding 76 at the end of the optical fiber 70. The facet 78 of the optical fiber 70 is angled such that light signals traveling along the core 74 that are reflected by the facet 78 travel through the window 98 in the optical fiber 70. The optical fiber 70 can be used in conjunction with a holder 82 such as the holder 82 shown in FIG. 6C, however, the holder 82 need not have a reflecting side 94. The holder 82 includes a trench or recess 90 in a body 92. The end of the optical fiber 70 can be positioned in a recess 90 in the holder 82. The holder 82 is positioned on the system such that the window 98 is aligned with a via in the first device 72 and is immobilized relative to the via. For instance, the window 98 is aligned with the via such that a light signal that is reflected off of the facet 78 exits the optical fiber 70 through the window 98 and then travels through the via. The via can be constructed according to FIG. 3A through FIG. 3B. The anti-reflective coating 64 evident in FIG. 3B are not shown in the interface of FIG. 7 in order to simplify the illustration.

The via in the first device 72 is optically aligned with a wedge 44 and port in a second device 80. As described above, the wedge 44 and port and configured such that a light signal that travels through the via in the first device 72 and then through the wedge 44 and port in the second device 80 are directed into the waveguide traveling in a direction that is substantially parallel to the axis of the waveguide (parallel to the direction of propagation of light signals through the waveguide). As a result, the light signals from the optical fiber 70 exit the optical fiber 70, are reflected off the reflecting side 94, and then travel through the via in the first device 72, the wedge 44 on the second device 80, the port on the second device 80 and enter the waveguide on the second device 80. Alternately, the system can be operated such that light signals from the waveguide on the second device 80 travel through the port and wedge 44 on the second device 80, and through the via on the first device 72, are reflected off the reflecting side 94 on the holder 82 and enter the optical fiber 70. As a result, FIG. 7 achieves the same result as the interface of FIG. 6A through FIG. 6C, however, the interface of FIG. 7 eliminates the need for the light signal to travel through the tenth light transmitting medium disclosed in the context of FIG. 6A through FIG. 6C.

As is evident from FIG. 7, the facet 78 of the optical fiber 70 has an angle of less than 90° relative to the axis of the optical fiber 70 (or relative to the direction of propagation of light signals through the waveguide). The angle of the facet 78 can be chosen such that the light signals pass through the window 98 at an angle that is substantially perpendicular to the plane of the window 98 and/or that is substantially perpendicular to the plane of the first device 72.

The facet 78 of the optical fiber 70 can be modified to include a reflecting material 97 in order to increase the portion of the light signal that is reflected. Suitable layers of reflecting material 97 include, but are not limited to, Al, Au, and Ag. In some instances, the facet 78 need not be modified with a reflecting material 97. For instance, a medium can be positioned between the facet 78 and the holder 82. The medium can have an index of refraction that causes the light signal to be reflected by at the facet 78. In some instances, the medium is selected to immobilize the facet 78 relative to the holder 82. Suitable media include, but are not limited to a polymer epoxy.

A seventh light-transmitting medium 84 can be positioned between the optical fiber 70 and the first device 72. In some instances, the seventh light-transmitting medium 84 is also positioned between the holder 82 and the first device 72. Suitable seventh light-transmitting media include, but are not limited to, index matching materials and materials that immobilize the facet 78 relative to the first device 72 such as epoxies. In some instances, the tenth light-transmitting medium 96 is configured to immobilize the end of the optical fiber 70 in the holder 82. Suitable tenth light-transmitting media include, but are not limited to silica or polymer epoxy.

An anti-reflective coating 86 can be positioned at the interface between the seventh light-transmitting medium 84 and the first device 72. A suitable anti-reflective coating 86 includes, but is not limited to, single-layer coatings such as silicon nitride or aluminum oxide, or multilayer coatings which may contain silicon nitride, aluminum oxide, and/or silica.

Although not illustrated in FIG. 5A through FIG. 7, the system can include additional devices between the first device 72 and the second device 80. For instance, devices between the first device 72 and the second device 80 can each include a via aligned with the via in the first device 72. As a result, a light signal being exchanged between the second device 80 and the optical fiber 70 can travel through the via in the first device 72 and the aligned vias in any additional devices between the first device 72 and the second device 80. For instance, the interface illustrated in any one of FIG. 5A through FIG. 7 can serve as the interface labeled IA or IB in FIG. 4. These interface respectively include two and four devices between the first device 72 and the second device 80.

The system can include one or more vertical interfaces according to FIG. 5A through FIG. 5C and/or one or more horizontal interfaces according to FIG. 6A through FIG. 7. Additionally, the edges of one or more devices in the system can each include one or more device facets 78 through which light signals can enter and/or exit the system and an optical fiber 70 can be configured to deliver light signals through one or these facets 78 and/or to receive light signals from these facets 78.

Additional details about the device and system construction and fabrication can be found in U.S. patent application Ser. No. 11/985,065, filed on Nov. 13, 2007, entitled "System Employing Optical Devices with Optical Vias," and in U.S. patent application Ser. No. 12/008,717, filed on Jan. 11, 2008, entitled "System Having Optical Amplifier Incorporated into Stacked Optical Devices," each of which is incorporated herein in its entirety.

In some instances, the above discussion expresses light signal direction as being substantially perpendicular to an entity such as plane. In some instances, a light signal is substantially perpendicular to the entity when the angle of the light signal relative to the entity is 90° or in a range of 88-92°, 89-91°, or 89.5-90.5°. In some instances, the above discussion expresses light signal direction as being substantially parallel to an entity such as an axis or direction of propagation. In some instances, a light signal is substantially parallel to the entity when the angle of the light signal relative to the entity is 0° or in a range of (−2°)–2°, (−1°)–1°, or (−0.5°)–0.5°.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical system, comprising:
   optical devices that each have a top side and a bottom side between lateral sides, a first one of the devices having one or more first waveguides immobilized on a first base, the first device having a first via that defines an optical path that extends from the top side of the first device to the bottom side of the first device, and
   a second one of the devices having a second waveguide immobilized on a second base,
      the second device including a second port optically aligned with the second waveguide and optically positioned between the second waveguide and the first via such that the light signal exchanged between the optical fiber and one of the second waveguides travels through the second port, the second port configured to change a direction in which the light signal travels from a first direction to a second direction;

an optical fiber having a fiber facet immobilized relative to the first device and aligned with the first via, the first device being between the fiber facet and the second device, the first device, the second device and the optical fiber being arranged such that a light signal exchanged between the optical fiber and the second waveguide travels through the first via; and the second device including a wedge optically positioned between the second port and the first via such that that the light signal exchanged between the optical fiber and the second waveguide travels through the wedge, the wedge configured to change a direction that the light signal travels such that the light signal exits the second device traveling in a direction that is substantially perpendicular to a plane of the second device, or the wedge configured to change a direction that the light signal travels such that when the light signal enters the second device traveling in a direction that is substantially perpendicular to a plane of the second device the light signal enters the second waveguide traveling in a direction that is substantially parallel to a direction of propagation through the second waveguide at a facet of the second waveguide.

2. The system of claim 1, wherein each of the devices is a planar optical device.

3. The system of claim 1, wherein the devices are positioned such that each device has its top side adjacent to the top side of another device and/or has its bottom side adjacent to the bottom side of another device.

4. The system of claim 1, wherein the light signal exchanged between the optical fiber and the second waveguide travels between the first device and the second device in a direction that is perpendicular to a plane of the first device.

5. The system of claim 1, wherein the second port includes a reflecting side configured to reflect the light signal as the light signal travels through the second port.

6. The system of claim 5, wherein the reflecting side is not perpendicular to a plane of the second device and is not parallel to the plane of the second device.

7. The system of claim 1, wherein the fiber facet is not perpendicular to an axis of the optical fiber at the facet.

8. The system of claim 1, wherein an end of the optical fiber that includes the fiber facet is perpendicular to a plane of the first device.

9. The system of claim 1, wherein an end of the optical fiber that includes the fiber facet is parallel to a plane of the first device.

10. The system of claim 1, wherein the optical devices include one or more third devices that are each positioned between the first device and the second device, each of the third devices including a third via that defines an optical path that extends from the top side of the third device to the bottom side of the third device;

the one or more third devices being aligned with the first device and the second device such that the light signal exchanged between the optical fiber and one of the second waveguides on the second device travels through the third via on each of the third devices.

11. The system of claim 1, wherein the wedge is configured to change a direction that the light signal travels such that the light signal exits the wedge traveling in a different direction that a direction in which the light signal entered the wedge.

12. The system of claim 1, wherein the fiber facet is not perpendicular to an axis of the optical fiber at the facet.

13. The system of claim 1, wherein an end of the optical fiber that includes the fiber facet is perpendicular to a plane of the first device.

14. The system of claim 1, wherein an end of the optical fiber that includes the fiber facet is parallel to a plane of the first device.

15. The system of claim 1, wherein the optical fiber is held in a holder, the holder having a reflecting side optically positioned between the optical fiber and the first device, the reflecting side configured to reflect the light signal exchanged between the optical fiber and the second waveguide.

16. The system of claim 14, wherein the optical fiber includes a core, a cladding, a window through the cladding, and a reflecting material formed on the facet, the window positioned such that the light signal is exchanged between the first device and the reflecting material through the window, the facet and reflecting material configured to reflect the light signal from the window to the core of the optical fiber or from the core of the optical fiber to the window.

17. The system of claim 1, wherein the optical devices include one or more third devices that are each positioned between the first device and the second device, each of the third devices including a third via that defines an optical path that extends from the top side of the third device to the bottom side of the third device;

the one or more third devices being aligned with the first device and the second device such that the light signal exchanged between the optical fiber and one of the second waveguides on the second device travels through the third via on each of the third devices.

* * * * *